US011142016B2

(12) United States Patent
Thurailingam et al.

(10) Patent No.: US 11,142,016 B2
(45) Date of Patent: Oct. 12, 2021

(54) WATERMARK AND OTHER SECURITY FEATURES FOR THERMOPLASTIC SECURITY DOCUMENTS

(71) Applicant: Canadian Bank Note Company, Limited, Ottawa (CA)

(72) Inventors: Thivaharan Thurailingam, Stittsville (CA); David Cruikshank, Carleton Place (CA); Laurence Suzzarini, Ottawa (CA); Lawrence O'Gorman, Ottawa (CA); Sean Connelly, Ottawa (CA)

(73) Assignee: CANADIAN BANK NOTE COMPANY, LIMITED

( * ) Notice: Subject to any disclaimer, the term of this patent is extended or adjusted under 35 U.S.C. 154(b) by 34 days.

(21) Appl. No.: 16/092,369

(22) PCT Filed: Apr. 12, 2017

(86) PCT No.: PCT/CA2017/050452
§ 371 (c)(1),
(2) Date: Oct. 9, 2018

(87) PCT Pub. No.: WO2017/177328
PCT Pub. Date: Oct. 19, 2017

(65) Prior Publication Data
US 2019/0152252 A1    May 23, 2019

(30) Foreign Application Priority Data
Apr. 15, 2016    (CA) .................................. CA 2927176

(51) Int. Cl.
*B42D 25/455*    (2014.01)
*B42D 25/328*    (2014.01)
(Continued)

(52) U.S. Cl.
CPC ............ *B42D 25/455* (2014.10); *B32B 27/08* (2013.01); *B32B 27/365* (2013.01);
(Continued)

(58) Field of Classification Search
CPC .... B42D 25/455; B42D 25/351; B42D 25/30; B42D 25/40; B42D 25/41; B42D 25/378;
(Continued)

(56) References Cited

U.S. PATENT DOCUMENTS 10,385,514 B1 * 8/2019 Jones ..................... B42D 25/23
2005/0063027 A1 * 3/2005 Durst, Jr. ................ G07F 7/005
359/2
(Continued)

OTHER PUBLICATIONS

Introduction to Plastics and Elastomers, Editor(s): William Andrew Woishnis, Sina Ebnesajjad, In Plastics Design Library, 2012 pp. xxi-xxxiv, (http://www.sciencedirect.com/science/article/pii/B9781455778966000595) (Year: 2012).*
(Continued)

*Primary Examiner* — Michael N Orlando
*Assistant Examiner* — Abhishek A Patwardhan
(74) *Attorney, Agent, or Firm* — Olson & Cepuritis, Ltd.

(57) ABSTRACT

Micro-structures are formed within multilayer laminate security documents by embossing and/or debossing one or more thermoplastic layers prior to lamination of the layers. The embossed and/or debossed structures are arranged and/or formed in a way that creates a number of different security features, including a watermark formed by a relief microstructure pattern on an opaque film (layer), a multi-color optically variable device, a 3-dimensional feature over kinegram/metallic ink and/or embossment/debossment over printed surfaces.

7 Claims, 8 Drawing Sheets

Before Lamination

During Lamination

After Lamination (51) Int. Cl.
    *B42D 25/333*    (2014.01)
    *B42D 25/21*    (2014.01)
    *B42D 25/425*    (2014.01)
    *B42D 25/324*    (2014.01)
    *B42D 25/351*    (2014.01)
    *B42D 25/30*    (2014.01)
    *B42D 25/40*    (2014.01)
    *B42D 25/41*    (2014.01)
    *B42D 25/378*    (2014.01)
    *B42D 25/46*    (2014.01)
    *B32B 27/08*    (2006.01)
    *B32B 27/36*    (2006.01)
    *B32B 37/18*    (2006.01)
    *B32B 38/06*    (2006.01)
    *B42D 25/435*    (2014.01)

(52) U.S. Cl.
    CPC ............ *B32B 37/182* (2013.01); *B32B 38/06* (2013.01); *B42D 25/21* (2014.10); *B42D 25/30* (2014.10); *B42D 25/324* (2014.10); *B42D 25/328* (2014.10); *B42D 25/333* (2014.10); *B42D 25/351* (2014.10); *B42D 25/378* (2014.10); *B42D 25/40* (2014.10); *B42D 25/41* (2014.10); *B42D 25/425* (2014.10); *B42D 25/46* (2014.10); *B32B 2307/404* (2013.01); *B32B 2307/412* (2013.01); *B32B 2425/00* (2013.01); *B42D 25/435* (2014.10)

(58) Field of Classification Search
    CPC .... B42D 25/46; B42D 25/425; B42D 25/324; B42D 25/328; B42D 25/333; B42D 25/21; B42D 25/435; B32B 27/08; B32B 27/365; B32B 37/182; B32B 38/06; B32B 2307/404; B32B 2307/412; B32B 2425/00
    USPC ........................................................ 156/73.1
    See application file for complete search history.

(56) References Cited

U.S. PATENT DOCUMENTS

| | | | |
|---|---|---|---|
| 2005/0247794 A1* | 11/2005 | Jones ................. | B42D 25/23 235/487 |
| 2007/0026204 A1* | 2/2007 | Caulley ............... | B42D 25/00 428/195.1 |
| 2008/0136160 A1* | 6/2008 | Leenders ............. | B42D 25/29 283/72 |
| 2010/0295290 A1* | 11/2010 | Muth ................... | B32B 27/20 283/109 |
| 2013/0154250 A1* | 6/2013 | Dunn ................... | G02B 5/128 283/67 |
| 2013/0171423 A1* | 7/2013 | Cruikshank .......... | B41M 5/0064 428/172 |
| 2014/0197626 A1* | 7/2014 | Le Loarer ............ | B42D 25/29 283/85 |
| 2015/0290872 A1* | 10/2015 | Juriasingani ......... | B29C 59/026 428/161 |

OTHER PUBLICATIONS

Polycarbonate—Wikipedia (Year: 2015).*
Polycarbonate Details & Uses (Year: 2020).*
Glass Transition Temperature—Polycarbonate (Year: 2015).*

* cited by examiner

WATERMARK AND OTHER SECURITY FEATURES FOR THERMOPLASTIC SECURITY DOCUMENTS

CROSS-REFERENCE TO RELATED APPLICATIONS

This application is a U.S. National Stage of PCT/CA2017/050452, filed Apr. 12, 2017, which claims priority of Canadian Patent Application No. 2,927,176, filed Apr. 15, 2016, each of which is incorporated herein by reference.

FIELD OF THE INVENTION

The present invention relates generally to security documents. In particular, the present invention relates to new and improved methods for creating watermarks and other security features comprising micro-structures embedded within security documents comprised of laminated layers of thermoplastic, for example, identification (ID) documents, driver's licenses, passports, and banknotes.

BACKGROUND

The use of watermarks is known in the prior art. EP1518661B1 discloses a process which involves the softening of the polymer by electromagnetic radiation followed by stretching to create opacity differences within the substrate. The cost of the equipment for this process is high and since the polymer is laser ablated, toxic fumes are generated and need to be extracted. This leads to an expensive process for utilizing this method for producing a watermark.

WO 2007016148 A2 discloses an embossment and/or debossment method to produce a watermark for ID documents but this process only works for re-form resistant plastic and would not work for non-re-form resistant plastic such as polycarbonate.

U.S. Pat. No. 8,619,244 discloses a method that uses a fabric in the middle of an ID document to produce optical density differences. The variability in opacity was created by removing part of the fabric layer, which will be more transparent compared to the rest of the area. Again, this process will not work for polycarbonate-based documents where adhesion cannot be achieved during lamination with a fabric layer. The number of shades of transparency is also limited to the number of punched fabrics inserted. This solution also leads to a low resolution of the watermark. The present invention can produce a watermark on polycarbonate cards with various gray values which is controlled by the embossment height. The CTIP process has a resolution of 5 um in z-axis and can go up to a height of 160 um. It is possible to produce at least 32 shades using the currently available technology.

U.S. Pat. No. 4,711,690 discloses a method of forming a watermark in a multilayer identification card while layers of synthetic material of different transparency are laminated together. The heat and pressure applied during the lamination step is used to cause a displacement of opaque material from an opaque layer into depressions formed in an adjacent transparent layer, the different transparency levels created by this displacement, in the areas of the depressions, producing a shadow and light effect of a watermark. However, because the heat and pressure of the lamination step is used to create the displacement of opaque material, the lamination temperature that will be required for applications using a finely structured pattern of depressions will be too low. For the method of this patent, in order to maintain the integrity of such a finely structured pattern during the production of the watermark, the temperature applied to the two synthetic layers must be lower than the softening temperature of the transparent layer with the depression pattern, and the synthetic material of the opaque layer must have a lower softening temperature than both the applied lamination temperature and the softening temperature of the transparent layer. Restricting the lamination temperature in such a manner to maintain the pattern of depressions forming the watermark will prevent formation of a good lamination bond.

SUMMARY

New and improved methods are provided to form microstructures within multilayer laminate security documents by embossing and/or debossing one or more thermoplastic layers prior to lamination of the layers. The embossed and/or debossed structures are arranged and/or formed in a way that creates a number of different security features, including a watermark formed by a relief micro-structure pattern on an opaque film (layer), a multi-colour optically variable device, a 3-dimensional feature over kinegram/metallic ink and/or embossment/debossment over printed surfaces. In addition, a number of other security features may be provided, including phase-shifted multiplex provided throughout the security document or providing an enhanced effect over a laser engraved portrait, embedded micro-text that may be configured to be visible from only one side of the security document or to provide ghost micro-text forming a scrambled image on the other side of the security document for producing a recognizable image or pattern for use in secure documents, an anti-copy feature and/or an embossed window plug formed by a relief micro-structure pattern on a transparent film (layer), all of which are described in detail in the following description.

To obtain the micro-structures used for the methods described herein, depending on the desired security feature either a clear or opacified (white) polycarbonate film is embossed using hot lamination (herein referred to as a first lamination step). However, ultrasonic lamination, laser etching, Intaglio embossment, hot stamping or other means of forming micro-structures on any thermoplastic film may, alternatively, be used. Then, the embossed polycarbonate film is laminated with other polycarbonate layers using high temperature/high pressure lamination thereby creating the desired optical effect/feature. In the result, details of the micro-structures applied during the first lamination step are maintained and remain intact after the lamination of the multiple layers of the security document (e.g. ID card) and form a monolithic document having the embedded microstructures.

A watermark is a device that appears as various shades of lightness/darkness when viewed by transmitted light. It is heavily used in banknotes, visa pages, birth certificates, etc. First level security features are generally inserted into security documents for simple authentication by the general public. These features, including optically variable inks, watermarks, and holograms, have to be viewable and validated under ambient light without the aid of any devices. A watermark is a first level feature that is easy to validate under ambient light and difficult to counterfeit with a quality similar to the original watermark created during the substrate manufacturing process. This makes the watermark feature produced by the method described herein, for making watermark(s) for polycarbonate based ID documents, robust.

In accordance with the present invention there is provided a method for making a security document comprising an embedded micro-structure security feature in laminated thermoplastic layers of the security document. The method comprises: (a) embossing and/or debossing a thermoplastic layer to provide a thermoplastic layer comprising embossed and/or debossed structures; and, (b) laminating the thermoplastic layer comprising embossed and/or debossed structures with another thermoplastic layer using high temperature/high pressure wherein the lamination forms the embedded micro-structure security feature in the laminated thermoplastic layers of the security document.

An embodiment of the invention provides a micro-structure security feature in the form of a watermark. The layer of thermoplastic material of step (a) is opacified polycarbonate and the embossing and/or debossing of step (a) uses a first lamination step comprising hot laminating the layer of thermoplastic layer using an embossed lamination plate, wherein the microstructure is formed by the embossments of the lamination plate and step (b) uses a second lamination step for laminating the opacified layer with at least the other layer wherein the other layer(s) comprise transparent or clear polycarbonate. The embossing and/or debossing of the opacified polycarbonate layer during the first lamination step is performed at or higher than the polycarbonate's glass transition temperature. The embossing and/or debossing of step (a) is up to 80% in selected areas of the opacified polycarbonate layer. The embossed and/or debossed structures of the opacified polycarbonate layer of step (a) extend to a depth of 100 um for an opacified polycarbonate layer thickness of 125 um. The second lamination step is performed at a sufficiently high temperature that the thermoplastic layers reach their softening points.

For different embodiments of the invention the embossing and/or debossing may use any of ultrasonic lamination, laser etching/ablation, Intaglio embossment, hot stamping and hot lamination.

For another embodiment the micro-structure security feature is a multicolor optically variable security feature, wherein step (a) is a first lamination step comprising hot laminating the thermoplastic layer using a lamination plate having a lenticular lens and/or slanted and/or depth variation structures formed thereon and the embossed and/or debossed structure comprises a lenticular lens and/or slanted and/or depth variation structures; and step (b) is a second lamination step wherein the other thermoplastic layer is a thermoplastic layer which has been applied with optically variable device and the lenticular lens structure is positioned to overlap the optically variable device to provide the security document with the multicolor optically variable security feature producing multiple color shifts at different viewing angles of the optically variable feature. The optically variable device may comprise optically variable ink. The thermoplastic layer of step (a) may be opacified polycarbonate and the other thermoplastic layer of step (b) may be clear polycarbonate.

In another embodiment the micro-structure security feature is a 3-dimensional optical security feature, wherein step (a) is a first lamination step comprising hot laminating the thermoplastic layer using a lamination plate having a micro-structure formed thereon whereby the embossed and/or debossed structure comprises the micro-structure; and step (b) is a second lamination step wherein the other thermoplastic layer comprises a kinegram and the micro-structure is positioned to face the kinegram, wherein the kinegram layer has a different index of diffraction than the thermoplastic layer comprising the micro-structure, causing the micro-structure to become more visible and produce the 3-dimensional optical security feature.

In a further embodiment the micro-structure security feature is a phase-shifted multiplex optical security feature, wherein the thermoplastic layer of step (a) is embossed with a phase modulated line structure and one of the thermoplastic layer of step (a) and the other thermoplastic layer of step (b) is a laser-engravable thermoplastic layer whereby the laser-engravable thermoplastic layer flows into the phase modulated line structure during the laminating of step (b) to form a variation in thickness and produce the phase-shifted multiplex optical security feature after the laser-engravable thermoplastic layer has been laser-engraved.

A further embodiment provides a ghost micro-text optical security feature and the thermoplastic layer of step (a) is opacified polycarbonate and the opacified polycarbonate is micro-embossed to a maximum depth of 10 um whereby the security feature has greater visibility from one side of the security document than the other side.

Another embodiment provides a micro-structure security feature in the form of an anti-copy feature, wherein the embossing and/or debossing of step (a) uses a first lamination step comprising hot laminating the thermoplastic layer using an embossed lamination plate to form a micro-structure on the thermoplastic layer and step (b) uses a second lamination step for laminating the thermoplastic layer with micro-structure formed thereon between other thermoplastic layers whereby the other layer adjacent the micro-structure during the second lamination step is deformed by the micro-structure and forms the anti-copy feature. The micro-structure is preferably configured to allow light to reflect in various angles.

DETAILED DESCRIPTION

As detailed below the present invention provides security features formed and/or arranged by micro-structures within multilayer laminate security documents by embossing and/or debossing one or more thermoplastic layers prior to lamination of the layers.

1. Watermark

Figure 1:
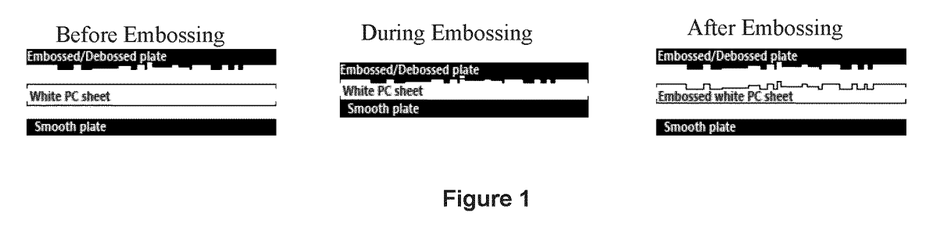
FIG. 1 is a schematic illustration of the first lamination step of a method for producing a watermark using an embossed plate to emboss an opaque polycarbonate sheet whereby the negative image on the plate creates a positive deformation or embossment on the white sheet.

An identification card is made up of a plurality of layers, including a white opacified layer in the middle layer that has been altered to comprise a watermark providing varying shades when viewed under transmitted light. To create a watermark by the method described herein a displacement of the opacified material is established using a lamination plate. The first lamination step, illustrated by FIG. 1, is completed prior to the second lamination step, illustrated by FIG. 2, of laminating together the multiple polycarbonate layers of the ID document. That is, a white opacified layer is altered by the first lamination step before that layer is laminated with other layers by the second lamination step to form the ID document. The so altered opacified layer is positioned in the interior or middle of the ID document where it is enclosed with clear layers of sheets on both sides. The displacement of the material of the opaque layer by means of the first lamination step can be done on an at least 25 um polycarbonate sheet using an embossed plate. The variation in optical transparency to result from the first lamination step can be determined by the thickness of the embossments on the plate.

A thermal gradient that the polymer layers are exposed to during lamination was found to stabilize the embossments whereby the watermark produced by means of the first lamination step (i.e. the using a lamination plate) remains intact during the second lamination step.

Figure 3:
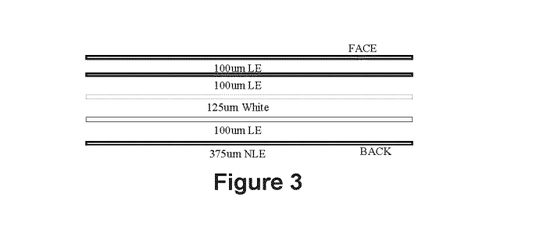
FIG. 3 is a schematic Illustration of a finished generic polycarbonate card construction, e.g. an ID card, wherein a white polycarbonate sheet is located between two clear polycarbonate sheets.

For the first lamination step, the watermark must be embossed onto the polycarbonate sheet while the sheet is at or higher than the material's glass transition temperature (i.e. the softening temperature of the material). This will displace the material away from the embossed region, thus creating variation in transparency. The embossments of the lamination plate form micro-structures such a 3-dimensional images and/or micro-text. For the illustrated example, an MLI plate having 50 um high lenses is used, the lenses being the raised feature on the plate which during lamination displaces the polymer and makes the sheet thinner in the area. This plate is used to laminate a 125 um white polycarbonate sheet. The differences in thickness formed during the process within the sheet lead to variations in transparency. The watermarked sheet is then used to produce an ID card laminate, an example of which is shown in FIG. 3.

An ID document is required to a certain opacity due to the machine readability of MRZ, 1D and 2D barcodes. For the ID card described herein an opaque polycarbonate material having high opacity is used, light transmission being about 20%. Debossing of the opaque layer is up to 80% in selected areas so, for a thickness of 125 um, the debossing extends to a 100 um depth. Advantageously, such a large debossing depth increases the light transmission by five times or more which makes it easier to see the watermark but it also makes the laminated sheet more fragiles so depths of more than 70% may not be desired for some applications.

A plate embossment height of less than 25 um would produce a watermark with lower transparency that cannot be detected clearly under ambient light. A flashlight would be necessary to improve the visibility of the watermark generated by a shallower embossment. A plate embossment height of less than 10 um would produce a watermark that can only be seen from one side when a backlight is used. Due to the diffusive nature of the opacified sheet, the information at the back will be destroyed when the light reaches the front. Therefore, only embossments at the front of the sheet/card will be visible. This characteristic can be utilized to produce two watermarks one on each side. The embossment height and the width must be controlled precisely to reduce the visibility of the watermark from the back, in the front.

Figure 4:
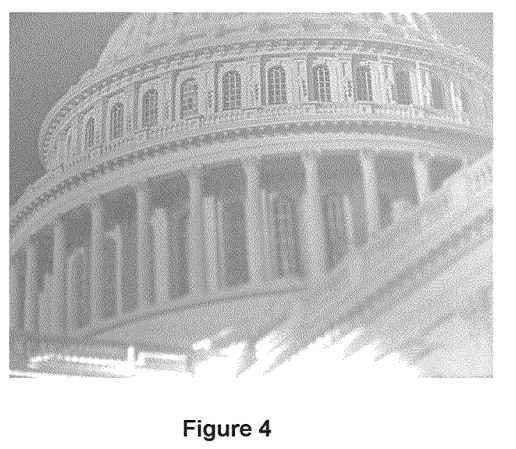
FIG. 4 illustrates (using Foster & Freeman VSC 6000H/S) an embossed micro-structure in the form of a capital building on a white polycarbonate sheet (of 125 um) to produce the watermark effect.

A 3-D micro-structured watermark generated during the first lamination step remained intact with all the details as shown in FIG. 4, following the second lamination step. Micro-structures such as the 3-D capital building image shown are maintained, embedded within the card. During the second lamination step, the polycarbonate layer adjacent the watermarked (altered) opaque layer flows and fills all the hills and valleys of the watermark. It was found that all the details of the embossed structures, including micro-text and fine lines were sustained in the watermark after the second lamination step. The heat flow during the second lamination process goes from the plate to the outer transparent or clear sheets, and then to the opacified or white sheet. The second lamination forms a monolithic card with micro-structures embedded within the card.

In order to achieve an effective lamination of thermoplastic films the temperature applied must be high enough that the films reach their softening points and the applied pressure will then fuse the films together to form a bond between the materials of the films. Without such softening, fusing and bonding there will not be an effective lamination of the films, and if the films do not reach higher than their softening temperature there will be no lamination.

Figure 2:
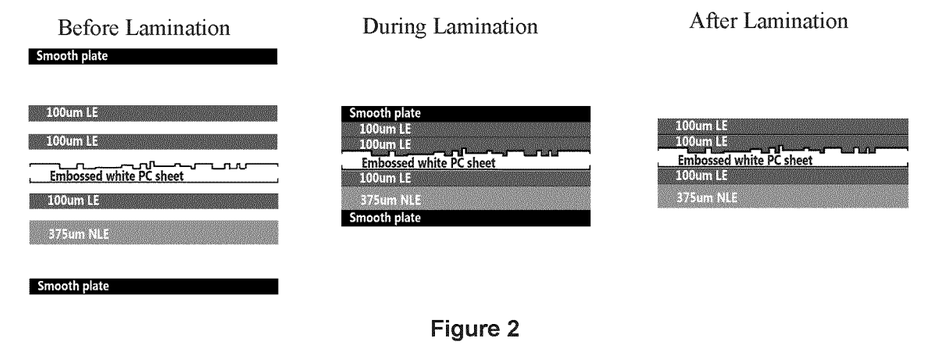
FIG. 2 is a schematic illustration of the second lamination step whereby layered polycarbonate films are placed between two lamination plates, and pressed at high temperature and pressure to fuse together and form a monolithic card, and the embossment created by the first lamination step is sustained after lamination.

For the second lamination step of FIG. 2 a temperature of approximately 160° C. is applied to the polycarbonate layers, which is about 10-15° C. higher than the softening temperatures of the polycarbonate layers, the softening point of which is 146-148° C. This lamination temperature allows the formation of strong bonding between the polycarbonate layers while reinforcing or holding the embossed structures in place.

Figure 5:
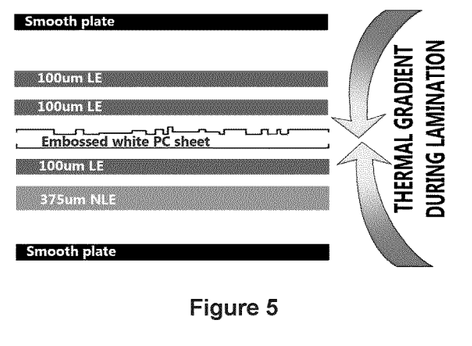
FIG. 5 illustrates the thermal gradient during the second lamination step whereby the opacified sheet in the middle reaches the glass transition temperature after the LE and NLE sheets have.

During the second lamination step, the lamination plates are closest to the heated surface followed by the clear and opaque sheets. This creates a thermal gradient throughout the card construction at the beginning of the lamination. Since both clear and opaque sheets have similar softening temperatures i.e. glass transition temperatures (Tg) of 146-148° C., the opaque sheet in the middle of the card construction will reach Tg later than the clear polycarbonate sheets. This allows the clear polycarbonate to flow into the peaks and valleys of the opaque sheet and helps to stabilize the embossments (i.e. the watermark) during the lamination process.

Other combinations and/or materials will yield similar results and are within the scope of this invention, including but not limited to utilizing substrate layers that are either thicker or thinner, utilizing different methods during the embossing step, as well as utilizing different types of substrates.

2. Multicolor/Structured Optically Variable Feature

Figure 6:
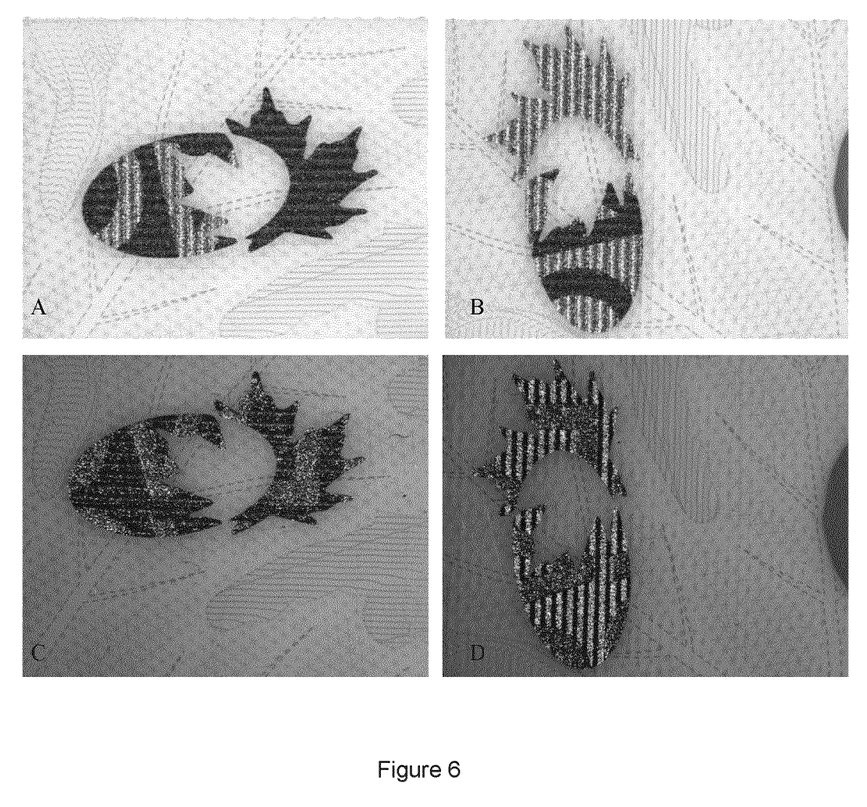
FIG. 6 illustrates a multi-color structured optically variable feature produced by forming a micro-structure over a printed surface and varying the physical orientation of the print in selected areas.

As illustrated in FIG. 6, an optically variable security feature embedded within a security document is provided.

A polycarbonate sheet is printed using a silk screen printing process to produce a single optical shift per view angle. Then a micro-structure pattern is embossed or debossed on the polycarbonate sheet over the optically variable print to produce a multicolor optically variable feature per view angle.

The samples shown in FIG. 6 are prepared as follows:

Optically variable ink is printed on a clear polycarbonate sheet by the silk screen process;

A lamination plate having a lenticular lens structure formed thereon is used to laminate another white polycarbonate sheet via a first lamination step, to produce an embossed/debossed white polycarbonate sheet with lenticular lens structure;

The embossed/debossed white polycarbonate sheet is placed on top of the silk screen printed clear polycarbonate sheet so that the lenticular lens structure overlaps the optically variable ink on the clear polycarbonate sheet;

The two sheets are laminated together via a second lamination step, and this selectively alters the orientation of the optically variable print to provide an optically variable security feature comprising multiple color shifts.

As shown in FIG. 6, the lenticular lenses formed by the first lamination step are used to orient the optically variable print and this physical alteration allows for multiple color shifts per view angle. Embossing to a different depth, pixilating the structures to various angles, and/or shapes such as saw tooth and Fresnel lens may be selected for use in another embodiment and the selected lens can also be applied over metallic pigments/films, interference pigments, and other printed films for another embodiment.

3. 3D Feature Over Hologram/Kinegram

Figure 7:
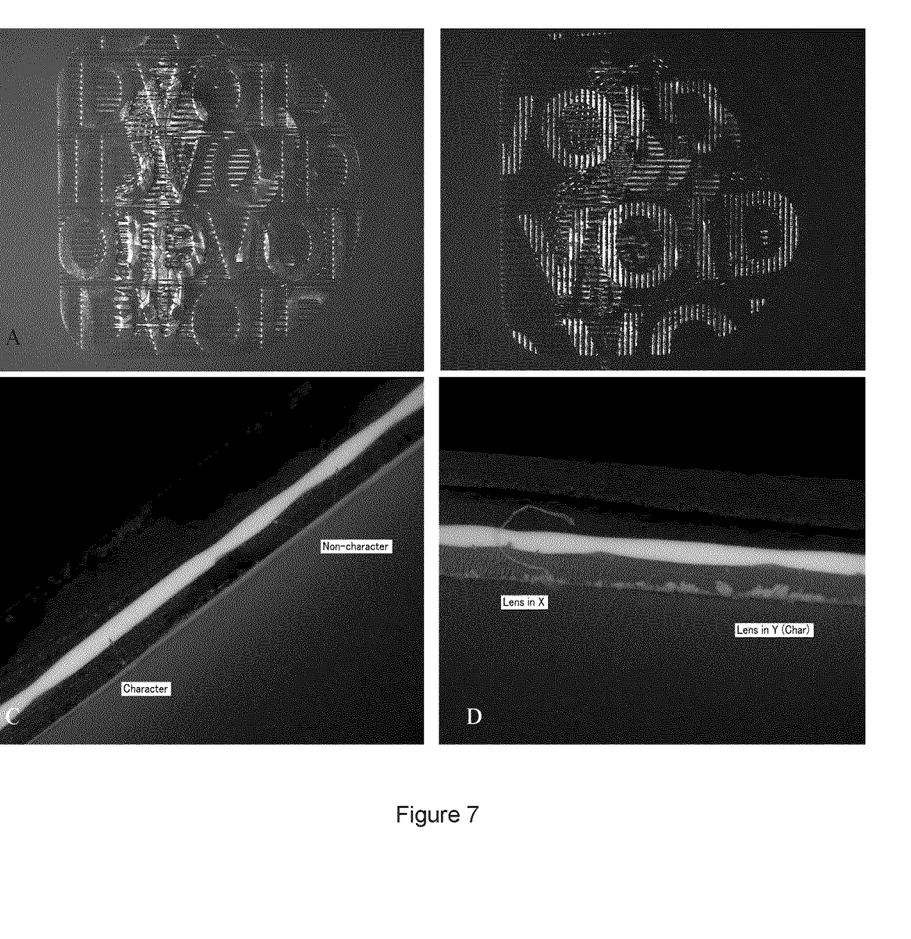
FIG. 7 illustrates in images A and B micro-structuring over a kinegram film and in images C and D lenticular lens structures applied over the surface to induce optical effect.

As illustrated in FIG. 7, a 3-dimensional (3D) optical security feature embedded within a security document is also provided.

A micro-structure pattern is applied to the surface of a kinegram (an animation feature) and produces an optical 3-dimensional effect. The following steps were performed to obtain such effect:

A first lamination step uses a micro-structured lamination plate to emboss/deboss a clear or white polycarbonate sheet;

The embossed/debossed polycarbonate sheet is positioned to face a kinegram layer, with the embossments/debossments overlapping the kinegram;

The layered sheets are laminated together via a second lamination step under high temperature and pressure The second lamination step places the micro-structures over the kinegram and, because the kinegram layer has a different index of diffraction than the polycarbonate layer with the micro-structure pattern, the micro-structure pattern becomes more visible and provides a 3D optical security feature.

Embossing to different depth, pixilating the structures to various angles, shapes such as saw tooth and Fresnel lens may be selected for use in another embodiment.

4. Phase Shifted Multiplex

Figure 8:
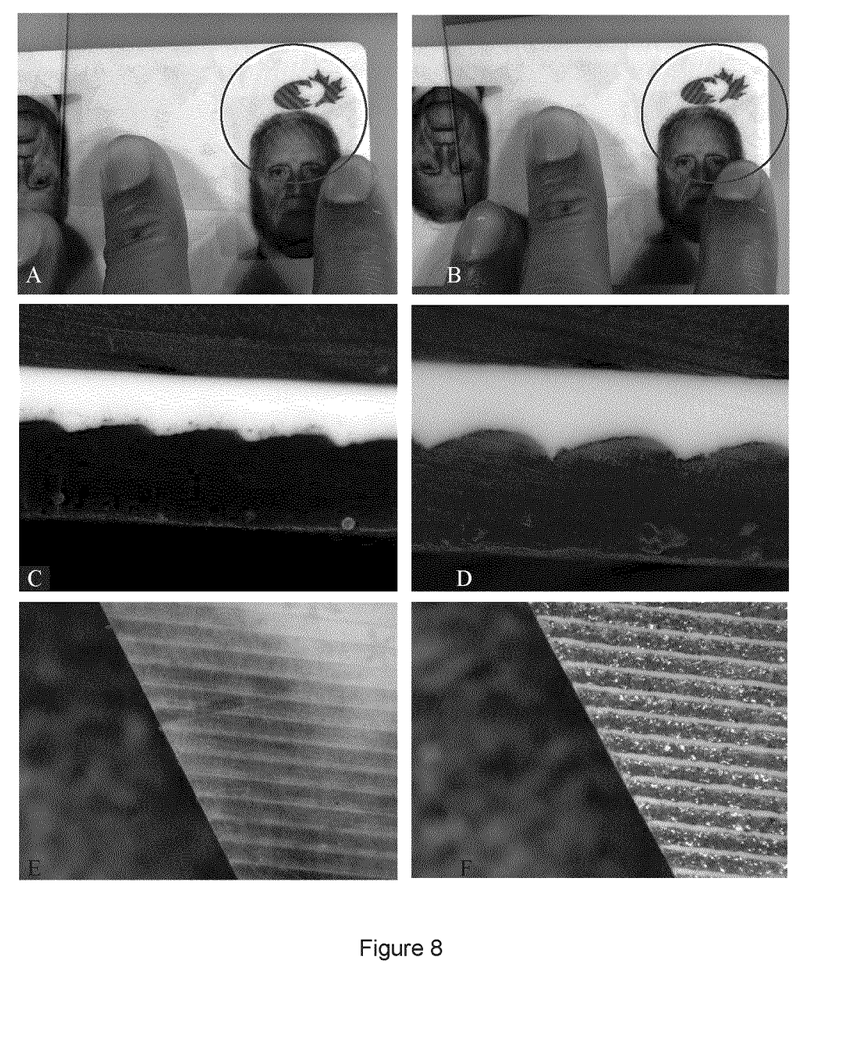
FIG. 8 illustrates a multiplex effect obtained by micro-structuring within a card.

As illustrated in FIG. 8, a phase-shifted multiplex optical security feature embedded within a security document is also provided.

A multiplex feature is a phase modulated feature whereby a series of parallel lines are produced and parts of the lines are phase modulated, the phase modulated lines being difficult to see by the naked eye but they become visible when an appropriate matching lenticular lens (i.e. having a matching line frequency) is placed over them.

The present multiplex security feature is obtained by embossing or debossing a white or clear substrate to obtain depth (thickness) variation in a laser engravable layer. This is done via a first lamination step.

During a second lamination step, the card construction is arranged so that the laser engravable clear layer achieves variation in depth and the resulting variation in the thickness of laser engravable layer after the second lamination step affects the laser engraving as shown in FIG. 8E. By selecting an appropriate line frequency and depth, a multiplex image (i.e. feature) is produced which is barely/not visible to naked eye. Using a lenticular screen with similar line frequency as the embossment/debossment the effect can be visualized as shown in FIG. 8A.

The following two procedures can be used to achieve the desired thickness variation in the laser engravable layer:

1. During the first lamination the white layer can be embossed with a phase modulated line structures and then, for the second lamination, a laser engravable layer is positioned beside the embossed white layer. During the second lamination the laser engravable layer flows into the phase modulated pattern and produces a variation in thickness.

2. A laser engravable layer is embossed in similar manner via a first lamination. During the second lamination, an adjacent white polycarbonate sheet or non-laserable clear polycarbonate flows into the phase modulated line structures and maintains the variation in thickness.

A 169 lpi (lines per inch) structuring is done in saw tooth style. The parallel lines are made with 169 lpi screening. The lenticular lens used also has similar frequency. The effect is strong over optically variable pigment that is embossed with similar line frequency due to the high contract differences (FIG. 8F). The laser engraving produces sufficiently high contrast to visualize and protect the laser engraved area.

A similar technique using micro-lenses may be selected for another embodiment using micro-lenses. Embossing over an optically variable feature will also enhance the effect.

5. Ghost Micro-Text

Figure 9:
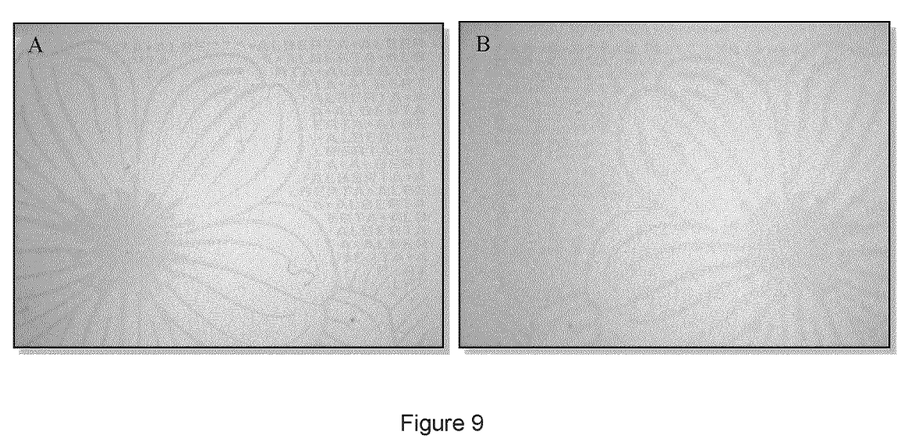
FIG. 9 illustrates the ghost micro-text feature formed by embossed micro-text within the card (imaged under transmitted light using Foster and Freeman VSC 6000/HS). Image A and B are captured from the front and back of the card, respectively.

As illustrated in FIG. 9, a ghost micro-text optical security feature embedded within a security document is also provided.

A ghost micro-text feature is obtained by micro-embossing over a white polycarbonate sheet via a first lamination step. The depth of the embossment should not be more than 10 um. The embossed feature will be visible under transmitted light only from one side. Due to the diffusive nature of the opacified sheet, the information at the back will be destroyed when the light reaches to the front (see FIG. 9). Therefore, only the embossments at the front of the document (being the side where the embossments are) will be visible.

Figure 10:
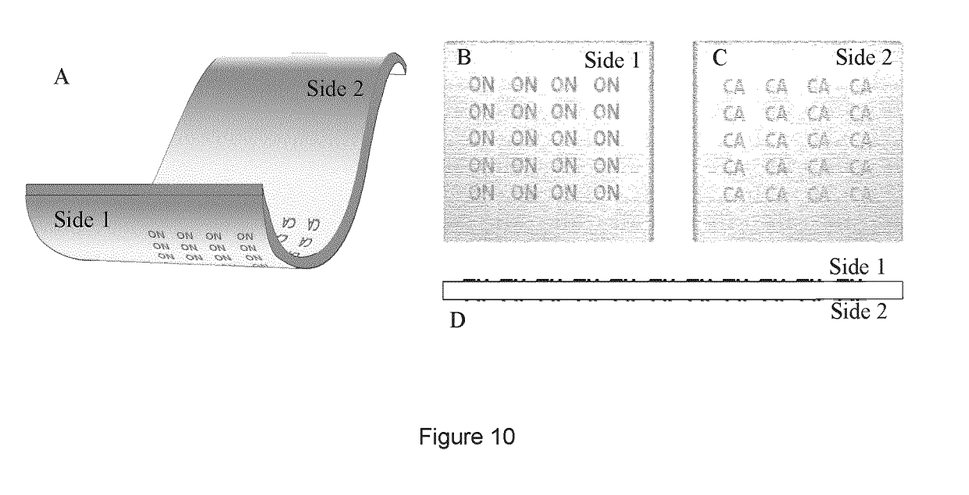
FIG. 10 illustrates double-sided watermarks for which two different embossments were applied on either side of the opacified sheet as shown in "A". Under transmitted light, the watermark will be visible as shown in image B and C.

This characteristic can be utilized to produce two watermarks, one on each side as shown in FIG. 10. The embossment height and the width must be controlled to reduce the visibility of the watermark from the back.

6. Window Plug

Figure 11:
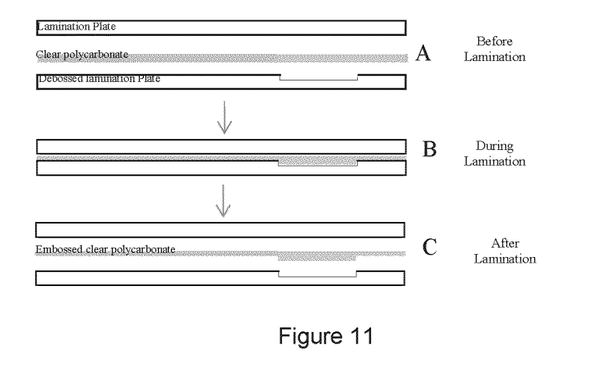
FIG. 11 is a schematic illustration of the first lamination step to form a window plug in a method for making an embossed clear sheet. A clear polycarbonate sheet is placed between two plates and laminated at high temperature and pressure. A recess in one of the plates allows for plug formation on the clear polycarbonate sheet as shown in C.

As illustrated in FIG. 11, a window plug security feature embedded within a security document is also provided.

A window of an ID document has heretofore been formed by removing a part of the white area. During lamination, the clear polycarbonate found on either side of the white polycarbonate fills the void to form a window. Since the clear polycarbonate sheet has to flow into the punched white layer, high pressure and longer lamination are necessary. An improved method of making the window with lower cost and minimal spoilage is provided.

For the embodiment illustrated, two white polycarbonate layers are punched to form a window. A polycarbonate plug is manually inserted into the void area to help the filling of the window during lamination.

A clear polycarbonate sheet is laminated using the plug plate to emboss plugs onto the sheet as shown in FIG. 11. The embossed plug will carry additional material that would be necessary to fill the void generated by punching the white polycarbonate sheet.

Figure 12:
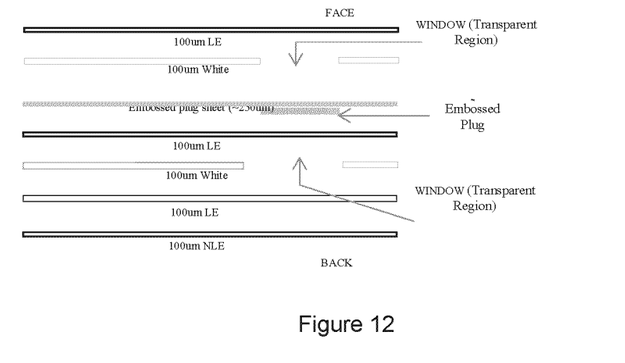
FIG. 12 is a schematic illustration of the second lamination step to form an ID card (e.g. EDL) with a window, showing the plug of the embossed clear sheet in the area of the window between the white sheets.

As shown in Table 1 below, the embossed plate provided a thickness of 51 um plug on a 375 um clear polycarbonate sheet. The embossed clear sheet was used in an ID card (e.g. EDL) construction without chip/antenna as shown in FIG. 12. A 375 um clear sheet was laminated to have an embossed window plug. The embossment yielded a 51 um thick plug on the sheet, and reduced the thickness of the clear sheet by approximately 20 um (375 um to 354 um).

TABLE 1

| Measurements | Height of the Embossed sheet | |
|---|---|---|
| | Over the Plug | Over non-plug area |
| 1 | 400 | 348 |
| 2 | 402 | 362 |
| 3 | 407 | 356 |
| 4 | 389 | 355 |
| 5 | 415 | 352 |
| 6 | 402 | 350 |
| 7 | 408 | 360 |
| 8 | 426 | 352 |
| 9 | 402 | 351 |
| Average | 405.1 | 354.4 |

The layered construction is laminated as shown. Advantageously, enables a faster lamination of cards and production of cards with windows than the previously used method.

As shown in FIG. 12, both 100 um white layers are punched to produce a transparent region within the card. The total volume of material removed is at least four times the amount of the material of the embossed plug. Increasing the volume of the embossed plug to match the removed white layer would produce various advantages including shorter lamination time, and reduced migration of clear layer into the window.

7. Anti-Copy Feature

Figure 13:
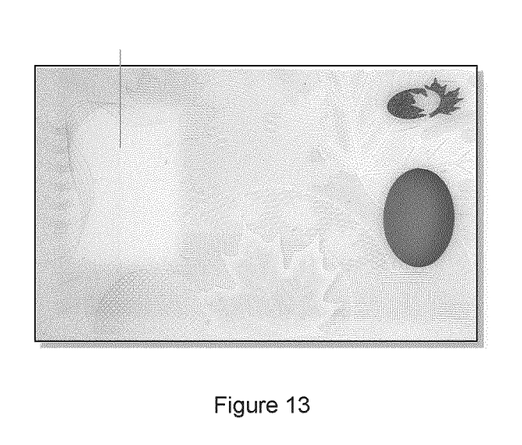
FIG. 13 illustrates an embedded anti-copy feature in accordance with the invention, shown in the area of the blue line wherein on the left side of the blue line a micro-structure feature embedded within the document allows visual differences to be seen during a scan which are not present on the right side; however, under flood light the visibility of this feature is minimal.
Figure 14:
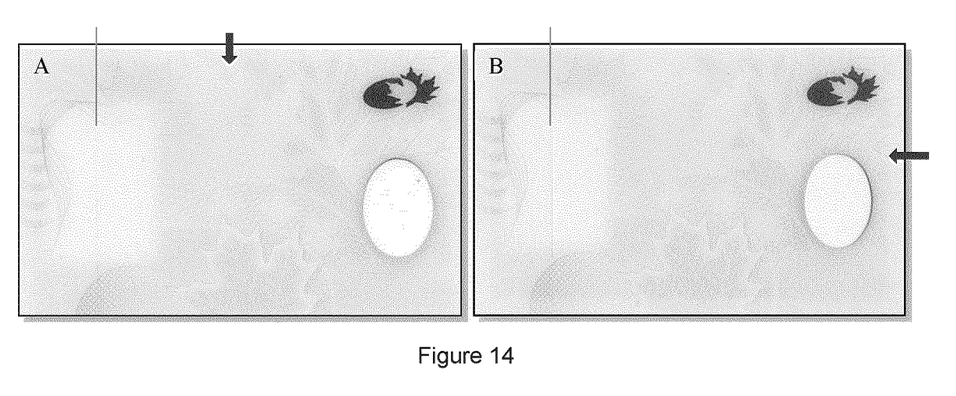
FIG. 14 shows a scanned card having the anti-copy feature, images A and B showing scans in different orientations, the blue arrow showing the direction of the light the card is exposed to during the scan, wherein when the light comes from the long direction the visibility of the anti-copy feature is minimal and when the light comes from the short direction visibility of the anti-copy feature is high.
Figure 15:
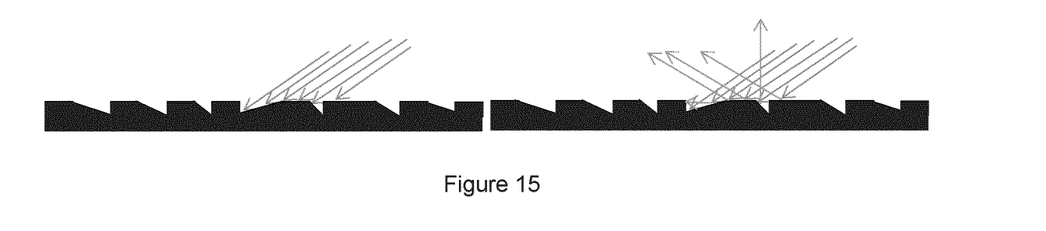
FIG. 15 illustrates an anti-copy feature using a saw-tooth design.

To produce an anti-copy feature, a polycarbonate sheet (e.g. a transparent or clear polycarbonate layer) is embossed with a micro-structure pattern by a first lamination step. Then the embossed sheet is placed between polycarbonate sheets (e.g. opacified polycarbonate layers), and via a second lamination step those layers are laminated together to obtain the final card. During the second lamination, the embossed micro-structure deforms the adjacent polycarbonate sheet to produce micro-structures at the surface of that layer. The so formed micro-structures are configured to allow light to reflect in various angles and this affect the quality of a scan of the document. As illustrated in the drawings, the incident light coming from the scanner in an angle interacts differently at the surface of the document and that interaction is captured by the sensor of the scanner.

What is claimed is:

1. A method for making a monolithic security document comprising an embedded micro-structure security feature in laminated thermoplastic layers of the security document, the method comprising:
   (a) embossing and/or debossing a polycarbonate thermoplastic layer to provide a polycarbonate thermoplastic layer comprising embossed and/or debossed structures; and,
   (b) laminating the polycarbonate thermoplastic layer comprising embossed and/or debossed structures with a polycarbonate thermoplastic sheet at a temperature of about 160 degrees C. while maintaining a thermal gradient between the thermoplastic layer and the thermoplastic sheet and using high pressure for a time period sufficient to form a monolithic security document with the embedded micro-structure security feature.

2. The method of claim 1 wherein the layer of thermoplastic material of step (a) is opacified polycarbonate and the micro-structure security feature is a watermark.

3. The method of claim 2 wherein the embossing and/or debossing of step (a) uses a first lamination step comprising hot laminating the layer of thermoplastic layer using an embossed lamination plate, wherein the microstructure is formed by the embossments of the lamination plate and in step (b) a transparent or clear polycarbonate thermoplastic sheet is used.

4. The method of claim 3 wherein the embossing and/or debossing of the opacified polycarbonate layer during the first lamination step is performed at or higher than the polycarbonate's glass transition temperature.

5. The method of claim 4 wherein the embossing and/or debossing of step (a) is up to 80% in selected areas of the opacified polycarbonate layer.

6. The method of claim 5 wherein the embossed and/or debossed structures of the opacified polycarbonate layer of step (a) extend to a depth of 100 um for an opacified polycarbonate layer thickness of 125 um.

7. The method of claim 6 wherein the second lamination step is performed at a sufficiently high temperature that the thermoplastic layers reach their softening points.

\* \* \* \* \*